(12) United States Patent
Steinberg et al.

(10) Patent No.: US 7,068,870 B2
(45) Date of Patent: Jun. 27, 2006

(54) VARIABLE WIDTH WAVEGUIDE FOR MODE-MATCHING AND METHOD FOR MAKING

(75) Inventors: Dan A. Steinberg, Blacksburg, VA (US); Neal Ricks, Blacksburg, VA (US); Mindaugas F. Dautartas, Blacksburg, VA (US); Hui Luo, Scarborough (CA)

(73) Assignee: Shipley Company, L.L.C., Marlborough, MA (US)

( * ) Notice: Subject to any disclaimer, the term of this patent is extended or adjusted under 35 U.S.C. 154(b) by 249 days.

(21) Appl. No.: 09/983,984

(22) Filed: Oct. 26, 2001

(65) Prior Publication Data

US 2003/0118310 A1 Jun. 26, 2003

Related U.S. Application Data

(60) Provisional application No. 60/243,444, filed on Oct. 26, 2000, provisional application No. 60/249,793, filed on Nov. 16, 2000.

(51) Int. Cl.
*G02B 6/12* (2006.01)
*G02B 6/26* (2006.01)
*G02B 6/42* (2006.01)

(52) U.S. Cl. .................... 385/14; 385/43; 385/132; 430/321; 65/386

(58) Field of Classification Search ............... 385/14, 385/15, 27, 28, 39, 43, 132, 49; 430/321; 65/385, 386
See application file for complete search history.

(56) References Cited

U.S. PATENT DOCUMENTS

| | | | |
|---|---|---|---|
| 3,984,173 A | 10/1976 | Shaw | 385/131 |
| 4,066,482 A | 1/1978 | Shaw | 117/56 |
| 4,097,118 A | 6/1978 | Hammer | 385/30 |
| 4,296,143 A | 10/1981 | Franken et al. | 427/574 |
| 4,370,021 A | 1/1983 | Khoe et al. | 385/33 |
| 4,384,038 A | 5/1983 | Khoe et al. | 430/321 |
| 4,415,227 A | 11/1983 | Unger | 385/43 |
| 4,426,440 A | 1/1984 | Thompson | 430/321 |
| 4,524,127 A | 6/1985 | Kane | 430/321 |
| 4,582,390 A * | 4/1986 | Furuya | 385/131 |
| 4,585,299 A | 4/1986 | Strain | 385/132 |
| 4,678,267 A | 7/1987 | Burns et al. | 385/43 |
| 4,688,884 A | 8/1987 | Scifres et al. | 385/38 |

(Continued)

FOREIGN PATENT DOCUMENTS

EP 0687925 12/1995

(Continued)

OTHER PUBLICATIONS

I.F. Lealman et al., "Tapered Active Layer Laser Device Performance and its Impact on Low Cost Optoelectronics", BT Laboratories, EMGW 2.2, pp 11-12.

(Continued)

*Primary Examiner*—Akm Enayet Ullah
*Assistant Examiner*—Daniel Petkovsek
(74) *Attorney, Agent, or Firm*—Jonathan D. Baskin (57) ABSTRACT

A variable width waveguide useful for mode matching between dissimilar optical waveguides and optical fibers and a method for making the same is described. In one embodiment, a tapered waveguide is etched in a substrate, a cladding material is laid over the upper surface of the substrate and within the waveguide, and the waveguide is then filled with a core material. The core material may be deposited in a single step, or in successive deposition steps.

38 Claims, 10 Drawing Sheets

U.S. PATENT DOCUMENTS

| | | | | |
|---|---|---|---|---|
| 4,697,868 A | * | 10/1987 | Thanivavarn | 385/11 |
| 4,702,547 A | | 10/1987 | Enochs | 385/88 |
| 4,773,720 A | | 9/1988 | Hammer | 385/131 |
| 4,779,788 A | | 10/1988 | Rossberg | 228/57 |
| 4,789,642 A | | 12/1988 | Lorenzo et al. | 438/31 |
| 4,886,538 A | | 12/1989 | Mahapatra | 65/30.13 |
| 4,927,781 A | | 5/1990 | Miller | 438/31 |
| 4,931,077 A | | 6/1990 | Angenent et al. | 65/31 |
| 4,991,926 A | | 2/1991 | Pavlath | 385/27 |
| 5,009,475 A | | 4/1991 | Knudson | 385/116 |
| 5,018,809 A | | 5/1991 | Shin et al. | 385/130 |
| 5,057,022 A | | 10/1991 | Miller | 438/31 |
| 5,071,216 A | | 12/1991 | Sullivan | 385/34 |
| 5,078,516 A | | 1/1992 | Kapon et al. | 385/129 |
| 5,135,590 A | | 8/1992 | Basavanhally et al. | 156/64 |
| 5,142,596 A | | 8/1992 | Mizuuchi et al. | 385/43 |
| 5,172,143 A | | 12/1992 | Baude et al. | 351/177 |
| 5,208,882 A | | 5/1993 | Strasser et al. | 385/37 |
| 5,261,017 A | | 11/1993 | Melman et al. | 385/38 |
| 5,265,177 A | | 11/1993 | Cho et al. | 385/14 |
| 5,278,926 A | | 1/1994 | Doussiere | 385/28 |
| 5,281,305 A | | 1/1994 | Lee et al. | 156/657 |
| 5,351,323 A | | 9/1994 | Miller et al. | 385/28 |
| 5,354,709 A | | 10/1994 | Lorenzo et al. | 117/8 |
| 5,412,748 A | | 5/1995 | Furuyama et al. | 385/92 |
| 5,431,775 A | | 7/1995 | Prince | 216/24 |
| 5,439,782 A | | 8/1995 | Haemmerle et al. | 430/321 |
| 5,444,805 A | | 8/1995 | Mayer | 385/49 |
| 5,456,797 A | | 10/1995 | Weber et al. | 437/67 |
| 5,465,860 A | | 11/1995 | Fujimoto et al. | 216/24 |
| 5,475,775 A | * | 12/1995 | Kragl et al. | 438/25 |
| 5,540,346 A | | 7/1996 | Fujimoto et al. | 216/24 |
| 5,546,209 A | | 8/1996 | Willner et al. | 398/43 |
| 5,560,760 A | | 10/1996 | Toeppen | 65/407 |
| 5,576,149 A | | 11/1996 | Yamamoto et al. | 430/321 |
| 5,627,928 A | * | 5/1997 | Matsuura et al. | 385/45 |
| 5,629,999 A | | 5/1997 | Henry et al. | 385/43 |
| 5,671,315 A | | 9/1997 | Tabuchi et al. | 385/137 |
| 5,671,316 A | | 9/1997 | Yuhara et al. | 385/137 |
| 5,672,538 A | | 9/1997 | Liaw et al. | 438/439 |
| 5,703,895 A | | 12/1997 | Ghirardi et al. | 372/50 |
| 5,737,474 A | | 4/1998 | Aoki et al. | 385/132 |
| 5,844,929 A | | 12/1998 | Lealman et al. | 372/45 |
| 5,854,868 A | | 12/1998 | Yoshimura et al. | 385/50 |
| 5,867,619 A | | 2/1999 | Jarek et al. | 385/52 |
| 5,868,952 A | | 2/1999 | Hatakeyama et al. | 216/66 |
| 5,896,481 A | * | 4/1999 | Beranek et al. | 385/90 |
| 5,940,557 A | | 8/1999 | Harker | 385/33 |
| 5,953,477 A | | 9/1999 | Wach et al. | 385/115 |
| 5,966,617 A | | 10/1999 | Ismail | 438/443 |
| 5,999,295 A | | 12/1999 | Vowell et al. | 398/164 |
| 6,003,222 A | | 12/1999 | Barbarossa | 29/600 |
| 6,037,189 A | | 3/2000 | Goto | 438/31 |
| 6,052,178 A | * | 4/2000 | Hirano | 356/73.1 |
| 6,108,478 A | | 8/2000 | Harpin et al. | 385/129 |
| 6,197,656 B1 | | 3/2001 | Adkinsson et al. | 438/423 |
| 6,216,939 B1 | | 4/2001 | Thackara | 228/124.6 |
| 6,229,947 B1 | | 5/2001 | Vawter et al. | 385/132 |
| 6,253,009 B1 | | 6/2001 | Lestra et al. | 385/50 |
| 6,292,609 B1 | | 9/2001 | Matsushima et al. | 385/43 |
| 6,317,445 B1 | | 11/2001 | Coleman et al. | 372/45 |
| 6,396,984 B1 | | 5/2002 | Cho et al. | 101/364 |
| 6,442,315 B1 | * | 8/2002 | Rhee et al. | 385/43 |
| 6,445,857 B1 | | 9/2002 | Korenaga et al. | 385/52 |
| 6,535,685 B1 | * | 3/2003 | Tullis | 385/137 |
| 6,571,039 B1 | * | 5/2003 | Al-hemyari et al. | 385/43 |
| 6,751,391 B1 | * | 6/2004 | Sidorin | 385/132 |
| 6,760,520 B1 | * | 7/2004 | Medin et al. | 385/43 |
| 6,775,453 B1 | * | 8/2004 | Hornbeck et al. | 385/129 |
| 2003/0002793 A1 | | 1/2003 | Dautartas | 385/37 |
| 2003/0068149 A1 | | 4/2003 | Dautartas et al. | 385/123 |
| 2003/0123833 A1 | | 7/2003 | Ricks et al. | 385/137 |

FOREIGN PATENT DOCUMENTS

| | | | |
|---|---|---|---|
| JP | 06018737 A | * | 1/1994 |
| WO | 97/42534 | | 11/1997 |
| WO | 02/095453 | | 11/2002 |
| WO | 03/050580 | | 6/2003 |

OTHER PUBLICATIONS

S. Najafi, "Introduction to Glass Integrated Optics", Artech House, Inc., 1992, pp. 19-24.

Y. Shani et al., "Efficient Coupling of a Semiconductor Laser to an Optical Fiber by Means of a Tapered Waveguide on Silicon", Appl. Phys. Lett. 55 (23), Dec. 4, 1998, pp. 2389-2390.

Spuhler et al., "Very Short Planar Silica Spot-Size Converter", Journal of Lightwave Technology, vol. 16, No. 9, Sep. 1998, pp. 1681-1685.

* cited by examiner

VARIABLE WIDTH WAVEGUIDE FOR MODE-MATCHING AND METHOD FOR MAKING

CROSS-REFERENCE TO RELATED APPLICATIONS

This application claims priority from provisional applications Ser. Nos. 60/243,444, filed Oct. 26, 2000, and No. 60/249,793, filed Nov. 16, 2000, the entire disclosures of which are incorporated herein by reference.

FIELD OF INVENTION

The invention relates to the manufacture of optical coupling devices, and more particularly to the formation of optical coupling devices having variable width waveguides.

BACKGROUND

Conventionally, optical fibers have waveguide modes which are shaped differently from integrated optic waveguides to which they are optically connected. To provide an efficient optical coupling between the optical fibers and the integrated optic waveguides, a mode converter is required. Known mode converters include tapered waveguides and GRIN (GRadient INdex) lenses. Examples of known tapered waveguides may be found in U.S. Pat. Nos. 5,854,868 (Yoshimura et al.), 5,265,177 (Cho et al.), and 5,009,475 (Knudson).

SUMMARY

The invention provides an optical waveguide that includes a substrate having an upper surface and a trench extending therethrough, a cladding material in the trench, and a core material in the trench. The trench has a varying profile along its length.

The invention further provides an integrated optic chip that includes a substrate having an upper surface, a waveguide having a varying profile along at least a part of its length, and integrated optical circuits optically coupled to the waveguide. The waveguide has a trench extending through the substrate, a cladding material in the trench, and a core material in the trench. The trench has a varying profile along at least a part of its length.

One aspect of the invention is a method for forming an optical waveguide that includes forming a trench through a substrate having an upper surface, wherein the trench has a varying profile along its length; locating a cladding material in the trench; depositing a core material on the cladding material in the trench; and planarizing the substrate to the upper surface.

In another aspect of the invention, a method for forming an optical waveguide includes the steps of forming a trench through a glass substrate having an upper surface, wherein the trench has a varying profile along its length; depositing a core material in the trench; and planarizing the substrate to the upper surface.

In another aspect of the invention, a method for forming an optical waveguide includes positioning a diffusion mask on an upper surface of a substrate, the diffusion mask including a tapered middle portion; diffusing ions through the tapered middle portion to form a waveguide; and dipping the substrate in an ion solution causing ions to diffuse through the substrate and causing the waveguide to take on a generally circular cross-sectional profile as it propagates into the substrate.

These and other advantages and features of the invention will be more readily understood from the following detailed description of the invention which is provided in connection with the accompanying drawings.

DETAILED DESCRIPTION OF PREFERRED EMBODIMENTS

Figure 4:
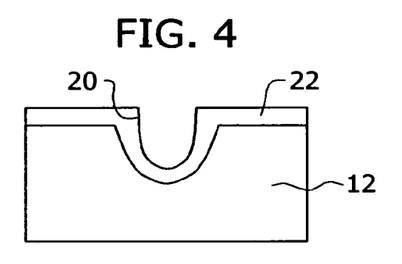
Figure 5:
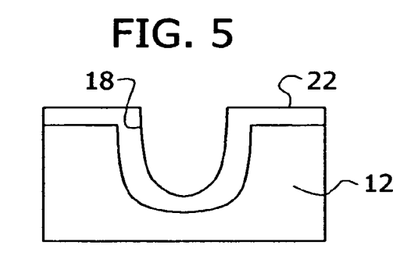
Figure 6:
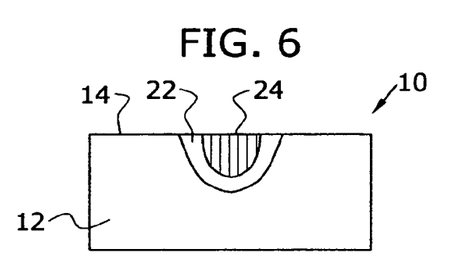
Figure 7:
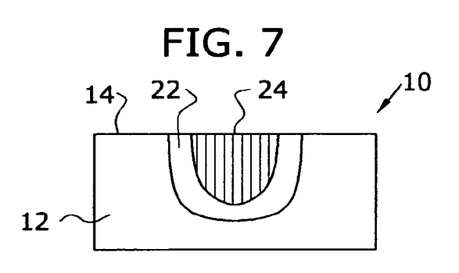

FIGS. 1–7 illustrate the fabrication of a tapered waveguide coupler 10 (FIGS. 6–7). The fabrication of the tapered waveguide coupler 10 begins with a substrate 12. The substrate 12 may be formed of silicon. A tapering trench 16 is formed in an upper surface 14 of the substrate 12. The trench 16 is tapered from a large end 18 to a small end 20. The trench 16 may taper in thickness, width or both.

Figure 1:
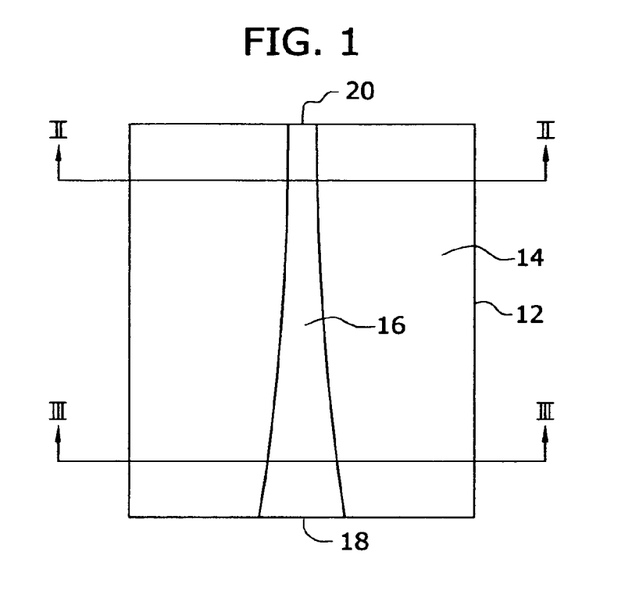
FIG. 1 is a top view of a substrate with a tapered trench constructed in accordance with an embodiment of the invention.

The tapering trench 16 may be formed through the use of gray-scale masking combined with etch techniques. Specifically, the trench 16 may be formed by gray-scale patterning of photoresist, transferring the gray-scale photoresist pattern onto the upper surface 14, and then etching the gray-scale pattern. Alternatively, the trench can be formed by isotropic etching and agitation.

Next, a cladding material 22 is administered to the upper surface 14 and the trench 16 of the substrate 12 (FIGS. 4–5). Preferably, the silicon substrate 12 is oxidized with a thermal oxidation process. Alternatively, the substrate 12 may be covered with a chemical vapor deposition (CVD) oxide or spin-on glass. Also, a combination of thermal oxide and CVD oxide can be used.

Referring specifically to FIGS. 6–7, a waveguide core material 24 is deposited within the trench 16 on top of the cladding material 22. The waveguide core material 24 may be a silicon oxynitride, a doped glass or similar material. Through a chemical-mechanical planarization process, the core material 24 is planarized to the upper surface 14, thereby finalizing the waveguide coupler 10. The waveguide coupler 10 is particularly useful for coupling to an integrated optic waveguide which is made according to a method disclosed in U.S. Provisional Application Ser. No. 60/240,805, filed on Oct. 16, 2000 by the same inventive entity as the present application, the entire disclosure of which is enclosed herein by reference. Optionally, an upper cladding layer can be deposited after planarization.

Figure 8:
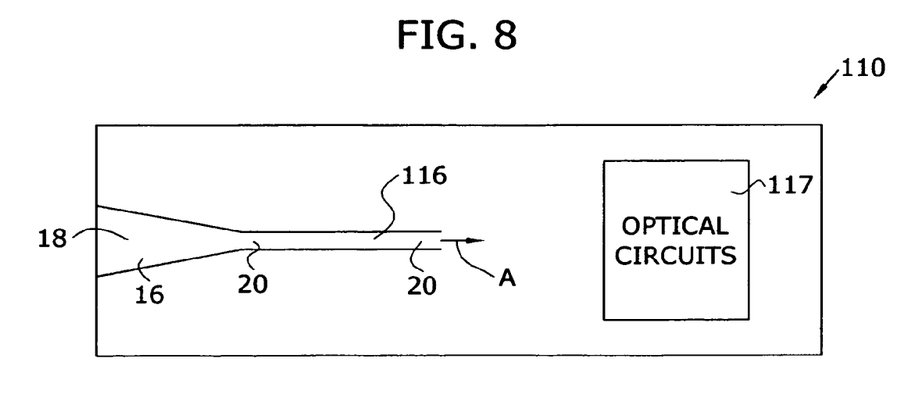
FIG. 8 is a top view of an integrated optical device constructed in accordance with another embodiment of the invention.

FIG. 8 illustrates a tapered waveguide which has been incorporated with a waveguide on an integrated optic chip 110. Specifically, the tapered trench 16 has been joined to a waveguide 116 of the integrated optic chip 110, thereby becoming a part of the integrated optic chip 110. Through such an integrated optic chip 110, light may enter the large end 18 of the tapered waveguide 16 and travel down the waveguide 116 in a direction A to schematically shown integrated optical circuits 117. As noted above, the tapered section 16 as well as the waveguide 116 may be formed utilizing gray-scale masks and etching. Typically, the large end 18 of the tapered section 16 corresponds to a high ultra-violet exposed region of the photoresist and the small end 20 corresponds to a partially ultra-violet exposed region of the photoresist. Gray-scale processing and etching of the waveguides 16, 116 further allows three-dimensional patterning capabilities over the entire integrated optic chip 110. Specifically, the waveguides 16, 116 can have independently varied thicknesses and widths.

Figure 9:
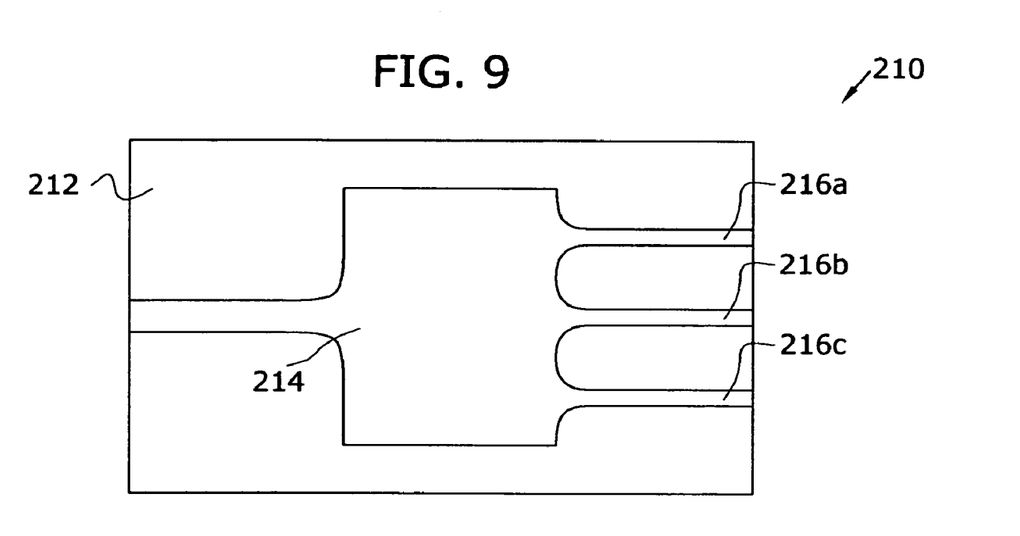
FIG. 9 is a top view of a multi-mode interference device constructed in accordance with another embodiment of the invention.
Figure 10:
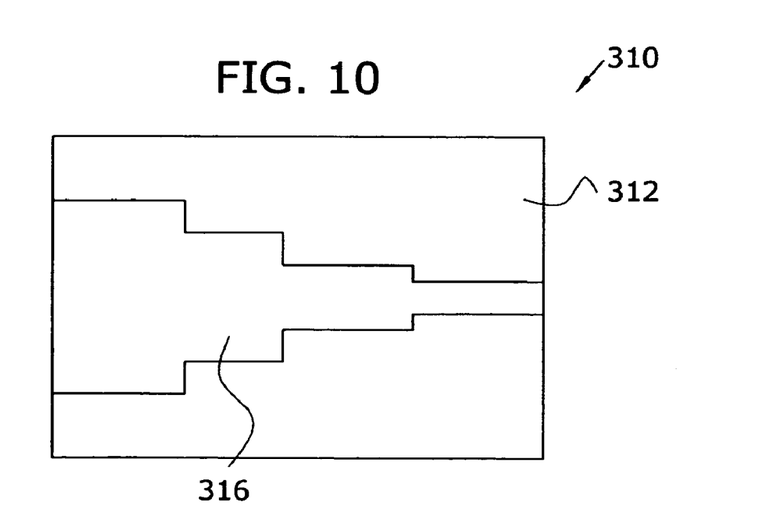
FIG. 10 is a top view of a stepped waveguide constructed in accordance with another embodiment of the invention.
Figure 11:
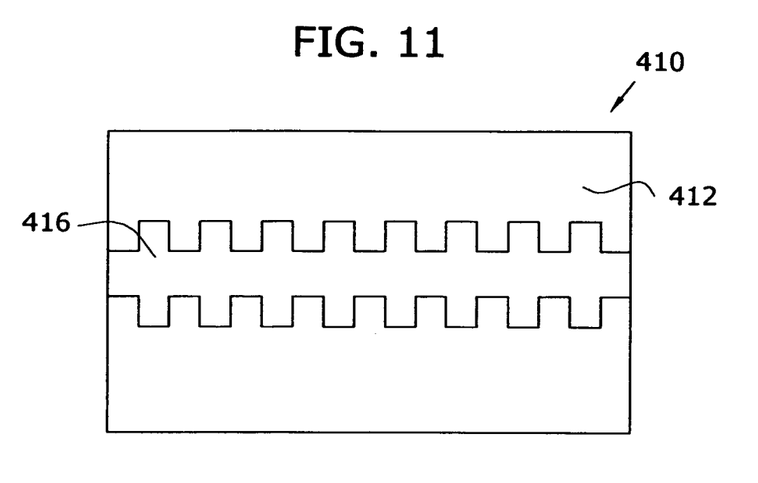
FIG. 11 is a top view of a variable width waveguide constructed in accordance with another embodiment of the invention.
Figure 12:
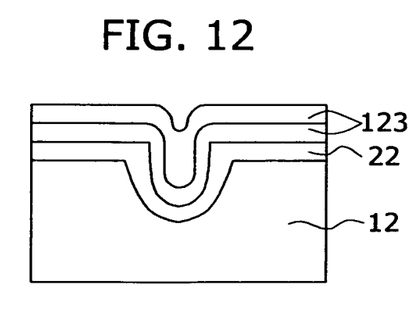
FIGS. 12–15 are side views of various stages of fabrication of a tapered waveguide from the substrate of FIG. 1 in accordance with another embodiment of the invention.
Figure 13:
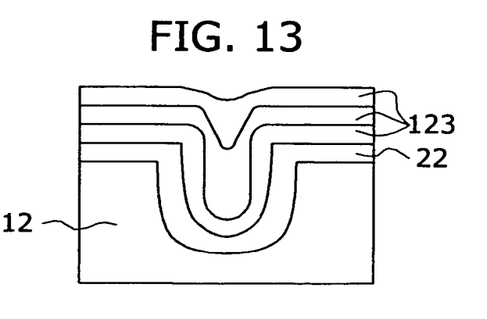

The gray-scale processing and etching may also be utilized to form additional optical coupling devices, such as a multi-mode interference (MMI) device 210 shown in FIG. 9. As illustrated, an input waveguide 214 may be patterned in a substrate 212. Further, output waveguide channels 216$_a$, 216$_b$, 216$_c$ may be formed adjoining the input waveguide 214. Alternatively, a stepped waveguide coupler 310 may be formed through gray-scale processing and etching. As shown in FIG. 10, a stepped waveguide 316 may be patterned in a substrate 312 to create the stepped waveguide coupler 310. Alternatively, gray-scale masking and etching techniques may be used to create periodic varying-width waveguides 416 in a substrate 412, resulting in a waveguide coupler 410 with periodic-width variations, as shown in FIG. 11.

Figure 2:
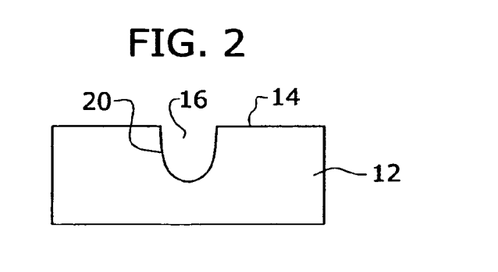
FIGS. 2–7 are side views of various stages of fabrication of a tapered waveguide from the substrate of FIG. 1.
Figure 3:
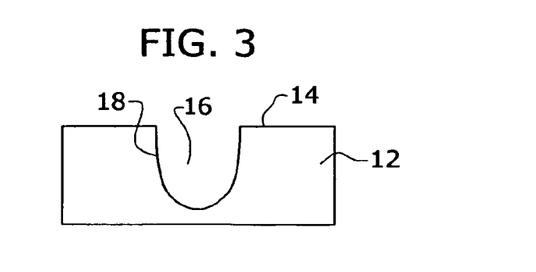
Figure 14:
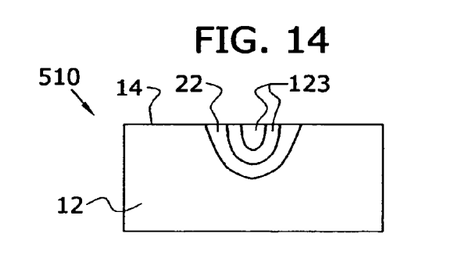
Figure 15:
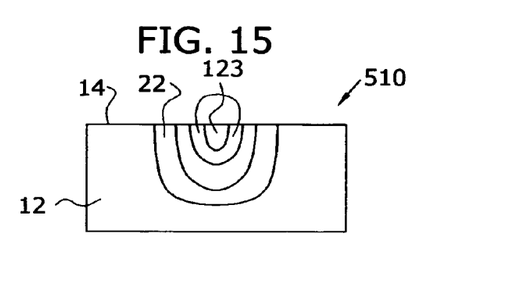

Instead of depositing a single waveguide core material 24, a single, continuously varied deposition step may be employed, e.g., CVD continuously varying the gas stoichiometry of core material in the tapered trench 16 may be performed to fabricate a waveguide coupling device. Such a method is illustrated in FIGS. 1–5 and 12–15. As shown in FIGS. 1–3, a substrate 12 has a trench 16 formed in it. The trench 16 tapers from a large end 18 to a small end 20. A cladding material 22 is deposited over an upper surface 14 and within the trench 16 (FIGS. 4–5). With reference to FIGS. 12–15, successive depositions or a continuous varied deposition of waveguide core material 123 are performed. The first deposited waveguide core material 123 has a high index of refraction. Each successive deposition of the waveguide core 123 has a reduced index of refraction, or the varied deposition is such that the deposition goes from a waveguide core 123 with a higher index of refraction to one with a lower index of refraction. The successive layers of deposited core material 123 create a graded composition core layer. Once the graded composition core layer has been frilly deposited then the device is planarized, thereby creating a waveguide coupler 510 (FIGS. 14–15). The planarization process planarizes to the upper surface 14 of the substrate 12.

Figure 16:
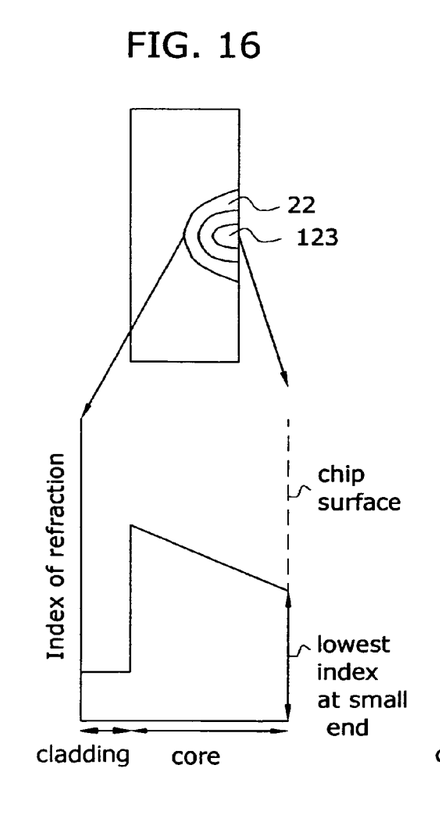
FIGS. 16–17 are graphs illustrating the index of refraction across a core of the waveguide of FIGS. 14–15.
Figure 17:
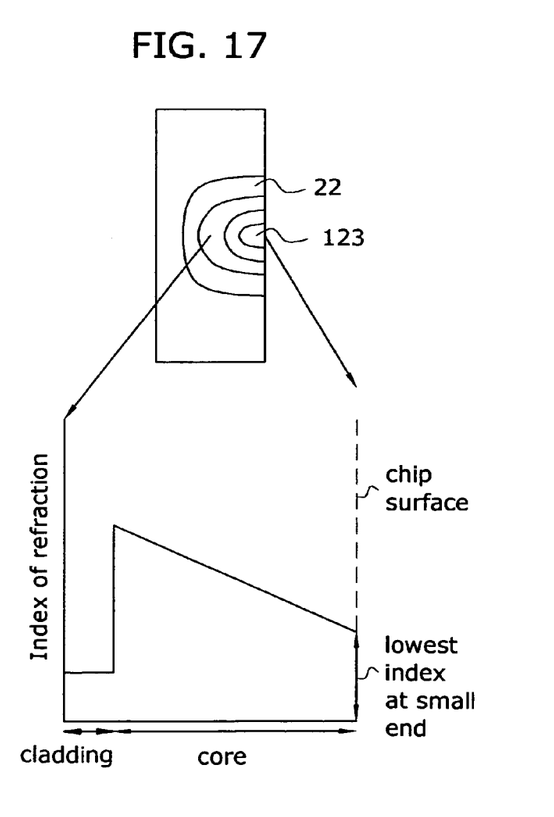
Figure 18:
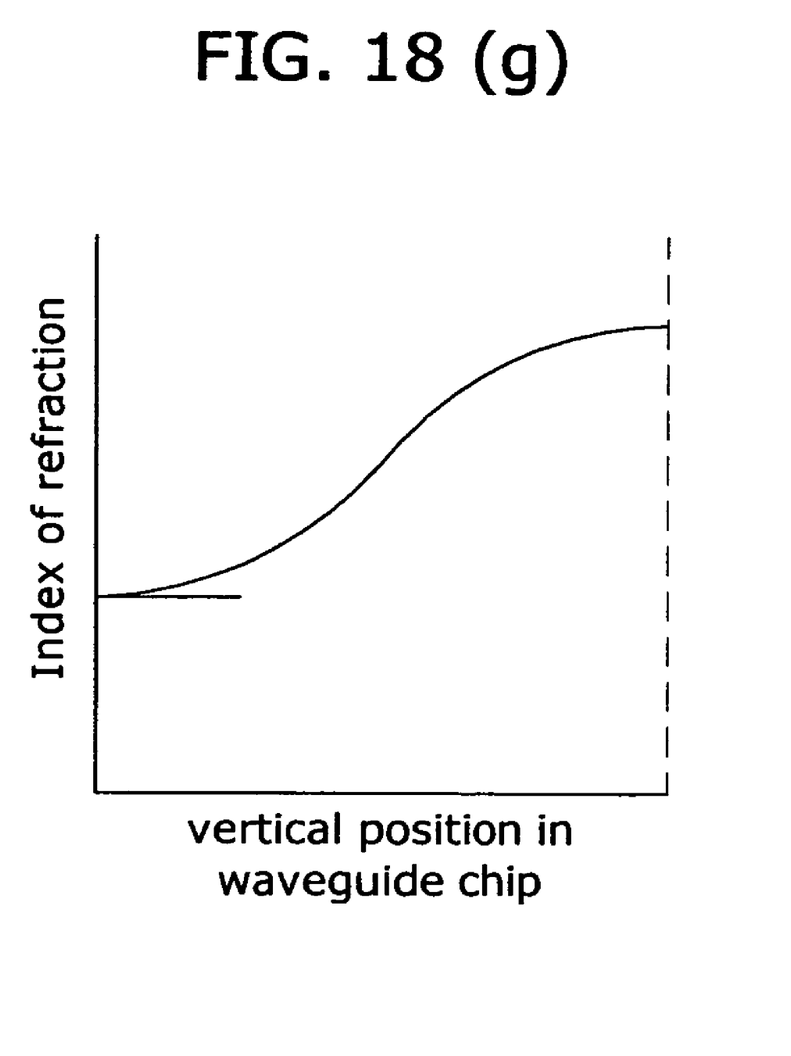
FIGS. 18(a)–18(g) are graphs of examples of possible refractive index profiles at the large end of waveguides constructed in accordance with an embodiment of the invention.
Figure 18A:
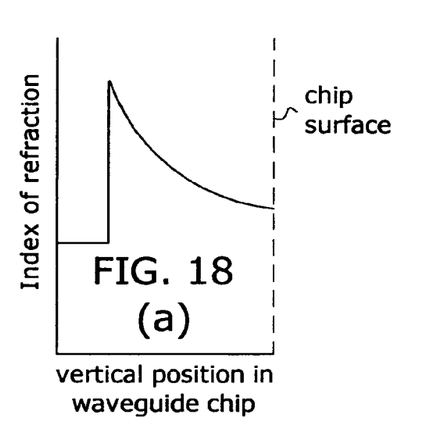
Figure 18B:
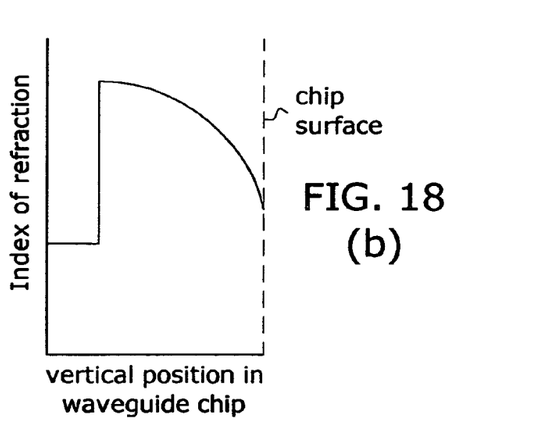
Figure 18C:
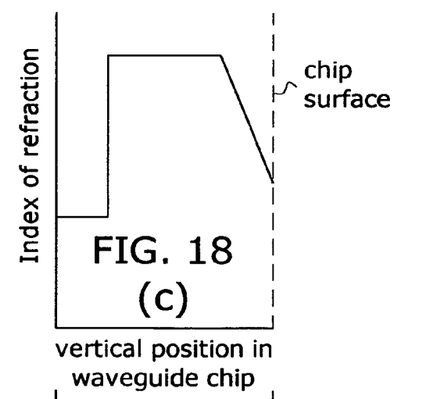
Figure 18D:
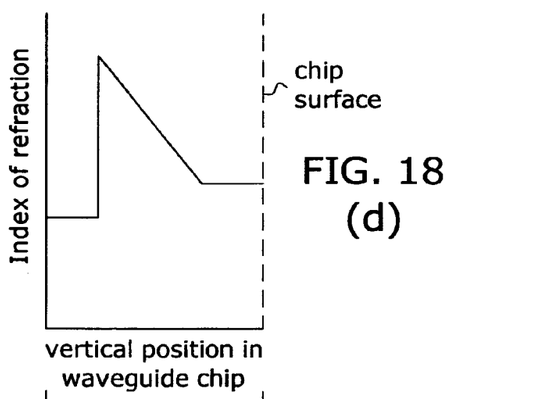
Figure 18E:
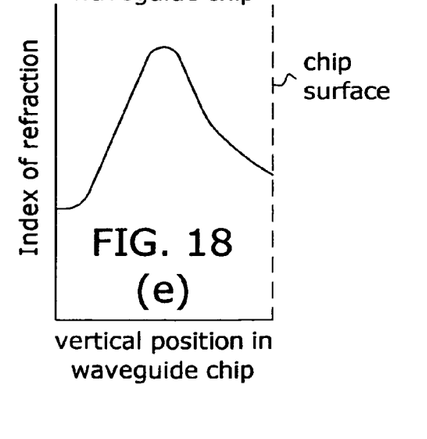
Figure 18F:
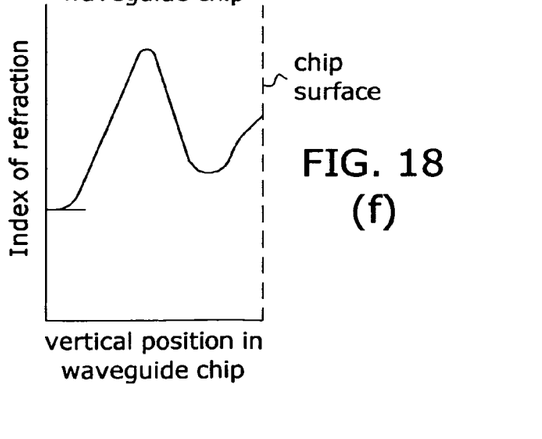
Figure 19:
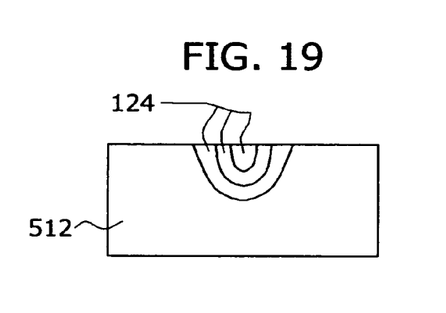
FIGS. 19–22 are side views of various stages of fabrication of a tapered waveguide from the substrate of FIG. 1 in accordance with another embodiment of the invention.
Figure 20:
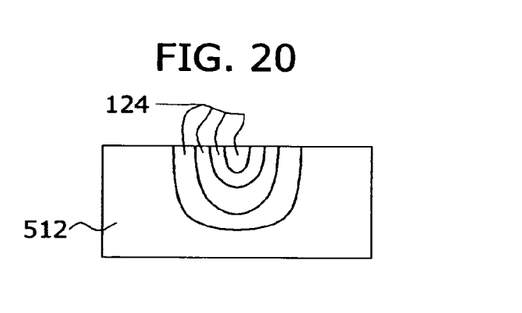
Figure 21:
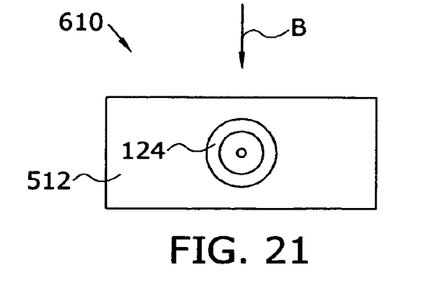
Figure 22:
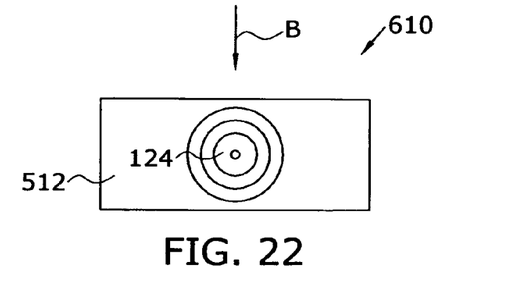

FIGS. 16–17 illustrate the index of refraction of the cladding material 22 and the waveguide core material 123. FIG. 16 shows refractive index at the small end 20 and FIG. 17 shows refractive index at the large end 18 of the substrate 12. As noted, the index of refraction for the cladding material 22 is less than the index of refraction of the waveguide core material 123. Further, as is shown, the index of refraction of the waveguide core material 123 is greater for the first deposited of such material and lessens with each successive deposition to the surface of the waveguide coupler 510. It should also be pointed out that the lowest index of refraction at the small end 20 may be greater than the lowest index of refraction at the large end 18. Since the waveguide within the tapered trench 16 is tapered, the waveguide core material 123 varies smoothly along the length of the waveguide. Thus, the waveguide coupler 510 is enabled to efficiently couple between waveguides having different refractive indices. For example, the waveguide coupler 510 may be used to couple optical fibers with a high Δn (with Δn equal to the core n minus the cladding n), or for high refractive index waveguides, for example, silicon oxynitride waveguides. This can be accomplished by coupling the optical fiber to the large end 18 (with a low core n) and coupling a high Δn waveguide to the small end 20 (with a high core n).

The index of refraction profile of a waveguide core material 123 may tale on many shapes other than the shapes indicated in FIGS. 16–17. FIGS. 18(a)–(g) provide several representative examples of potential refractive index profiles of a waveguide core material at the large end 18 of a waveguide coupler.

An alternative embodiment of the invention utilizes a glass substrate 512 (FIGS. 19–22) instead of the silicon substrate 12 (FIGS. 1–7). As with the embodiment illustrated in FIGS. 1–7, a tapered trench is formed through the glass substrate 512. The tapered trench may be formed by an isotropic wet etching, an anisotropic dry etching, or gray scale processing, for example. After the formation of the tapered trench, a waveguide core material 124 is deposited within the trench. The glass substrate 512 can itself serve as the cladding. After the trench is filled with the waveguide core material 124, the substrate 512 is planarized as described above in previous embodiments. In the embodiment using a glass substrate, the waveguide can have any of the refractive index profiles shown in FIGS. 18(a)–18(g).

Figure 23:
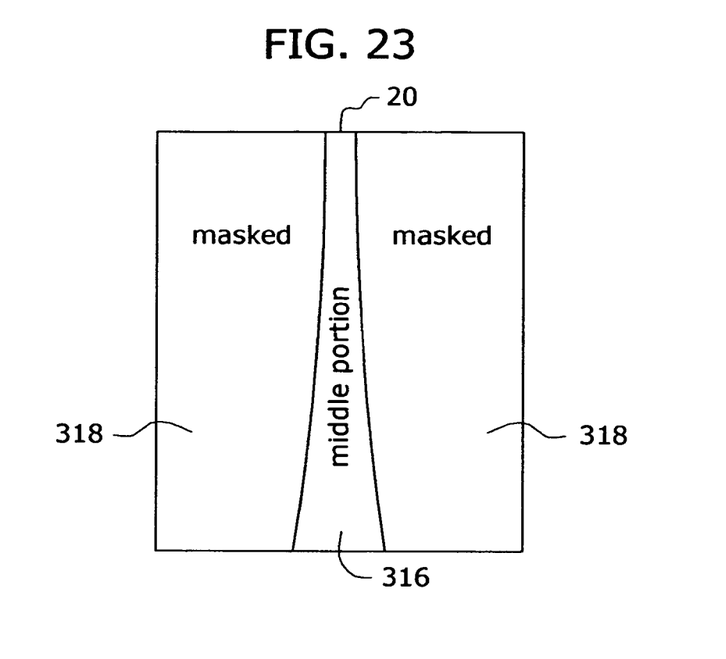
FIG. 23 is a top view of a masked substrate to be fabricated in accordance with another embodiment of the invention.
Figure 24:
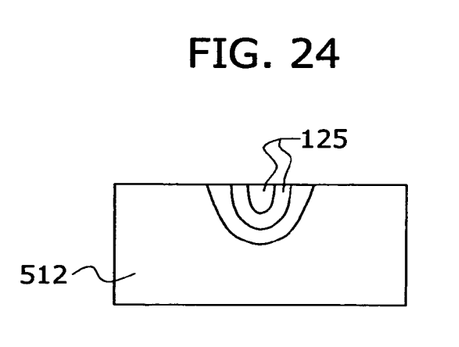
FIGS. 24–25 are side views of the substrate of FIG. 23.
Figure 25:
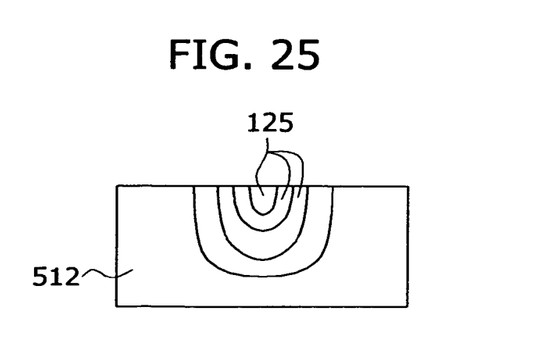

In an alternative embodiment illustrated in FIGS. 23–25, a waveguide may be formed in glass by the diffusion of ions from a salt melt. A diffusion mask having a tapered shape is patterned over the glass substrate 512. The diffusion mask leaves unmasked a tapered middle portion 316 sandwiched between masked portions 318. Diffusion of ions from the salt melt is allowed only in the middle portion 316 of the mask. Further, the tapered shape of the unmasked area 316 allows more ions from the salt melt to diffuse into the glass at the large end of the waveguide than at the small end of the waveguide. The diffusion of ions through the unmasked middle portion 316 of the glass substrate 512 creates a waveguide core material 125 as shown in FIGS. 24–25. Then, as described in reference to FIGS. 21–22, the glass substrate 512 is then dipped into an ion solution. Ions diffuse through the glass substrate 512 so that the waveguide propagates into the glass and becomes more rounded as it becomes further buried within the substrate 512.

Figure 26:
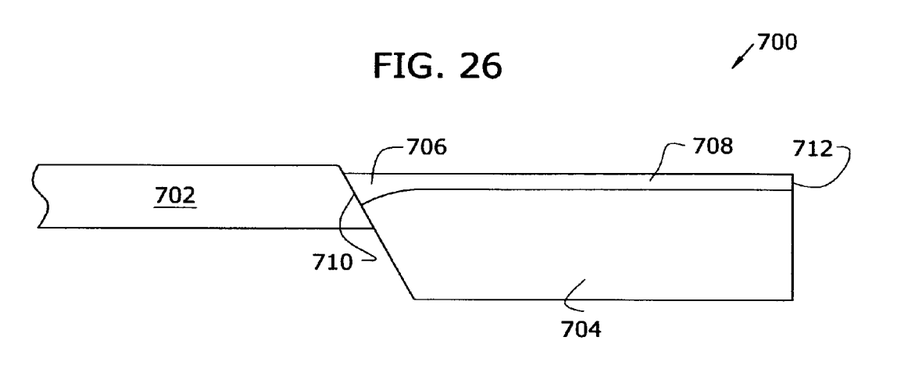
FIG. 26 is a side view of an optical device constructed in accordance with an embodiment of the invention.

FIG. 26 illustrates an optical device 700 which includes an optical fiber 702 and an integrated optic chip 704 coupled together. The fiber 702 is generally formed of a material which has a low Δn. The optic chip 704 includes a tapered waveguide portion 706 which is contiguous with another waveguide portion 708. The tapered waveguide portion 706 couples with the fiber 702 at a large end 710, with a small end of the waveguide portion 708 being on an opposite end of the optic chip 704. The waveguide portion 708 has a high Δn, and has a core with a higher n than that of the fiber 702.

Figure 27:
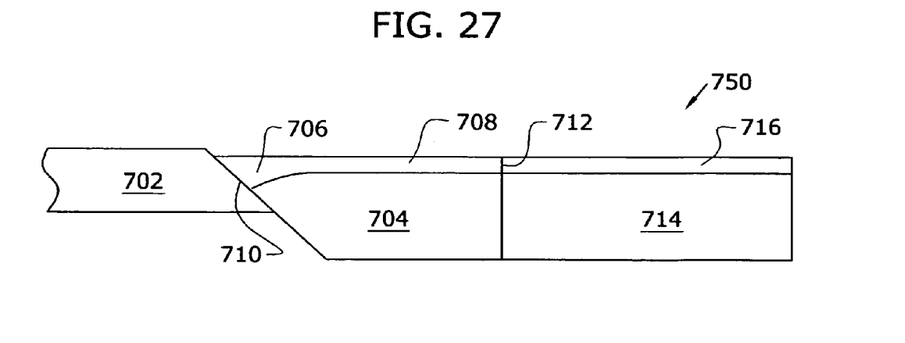
FIG. 27 is a side view of an optical device constructed in accordance with another embodiment of the invention.

FIG. 27 illustrates an optical device 750 which includes the low Δn optical fiber 702 and the integrated optic chip 704 coupled with a second integrated optic chip 714. The small end 712 of the waveguide portion 708 couples to a second high Δn waveguide portion 716. The waveguide portion 716 has a core with a higher n than that of the fiber 702.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed is:

1. An optical waveguide, comprising:
    a substrate comprising an upper surface and a trench therein, wherein said trench has a varying profile along at least a part of its length;
    a core material in said trench; and
    a cladding material in said trench between said substrate and said core material,
    wherein said core material and said cladding material have a varying profile along said at least said part of the length of said trench.
2. The optical waveguide of claim 1, wherein said trench has a profile which tapers from a large end to a small end.
3. The optical waveguide of claim 2, wherein said trench tapers in thickness.
4. The optical waveguide of claim 2, wherein said trench tapers from a large width to a small width.
5. The optical waveguide of claim 2, wherein said core material at said small end has a greater index of refraction at said upper surface than said core material at said large end.
6. The optical waveguide of claim 1, wherein said trench comprises an input waveguide channel and a plurality of output waveguide channels.
7. The optical waveguide of claim 1, wherein said trench has a stepped profile.
8. The optical waveguide of claim 1, wherein said trench has a profile with periodic variations in width.
9. The optical waveguide of claim 1, wherein the refractive index of said core material decreases in a thickness direction away from said cladding material.
10. The optical waveguide of claim 1, wherein said substrate comprises silicon.
11. The optical waveguide of claim 10, wherein said cladding material comprises silicon dioxide.
12. The optical waveguide of claim 1, wherein said core material comprises silicon oxynitride.
13. The optical waveguide of claim 1, wherein said core material comprises doped glass.
14. The optical waveguide of claim 1, wherein said substrate comprises glass.
15. The optical waveguide of claim 14, wherein said core material comprises successively deposited material on said cladding material, wherein each successively deposited material has a lower index of refraction than the preceding deposited material.
16. A method for forming an optical waveguide of claim 1, said method comprising:
    forming a trench in a substrate comprising an upper surface, wherein the trench has a varying profile along at least a part of its length;
    locating a cladding material in the trench;
    depositing a core material on the cladding material in the trench; and
    planarizing the substrate to the upper surface.
17. The method of claim 16, wherein said forming comprises:
    gray-scale patterning of a photoresist;
    transferring the patterning of the photoresist to the substrate surface; and
    etching the patterning of the photoresist.
18. The method of claim 16, wherein said forming comprises isotropic etching.
19. The method of claim 16, wherein the substrate comprises silicon, said locating comprising oxidizing the cladding material.
20. The method of claim 19, wherein said oxidizing comprises a thermal oxidation process.
21. The method of claim 16, wherein said locating comprises covering said upper surface and said trench with a chemical vapor deposition oxide.
22. The method of claim 16, wherein said locating comprises covering said upper surface and said trench with an oxynitride.
23. The method of claim 16, wherein said locating comprises covering said upper surface and said trench with a doped oxide.
24. The method of claim 16, wherein said depositing comprises successive depositions of the core material on the cladding material, wherein each successive deposited core material has a lower index of refraction than the preceding deposited core material.
25. The method of claim 16, wherein said planarizing comprises chemical-mechanical planarizing.
26. The optical waveguide of claim 1, wherein the trench is formed by etching away a portion of the substrate.
27. The optical waveguide of claim 1, wherein the core material and the cladding material are coplanar with the substrate upper surface.
28. An integrated optic chip, comprising:
    a substrate comprising an upper surface;
    a waveguide comprising:
        a trench in said substrate, said trench comprising a varying profile along at least a part of its length;
        a core material in said trench; and
        a cladding material in said trench between said substrate and said core material;
        wherein said core material and said cladding material have a varying profile along said at least said part of the length of said trench; and
    integrated optical circuits optically coupled to said waveguide.

29. The integrated optic chip of claim 28, wherein said trench has a profile which tapers from a large end to a small end.

30. The integrated optic chip of claim 29, wherein said trench tapers in thickness.

31. The integrated optic chip of claim 29, wherein said trench tapers from a large width to a small width.

32. The integrated optic chip of claim 29, wherein said core material at said small end has a greater index of refraction at said upper surface than said core material at said large end.

33. The integrated optic chip of claim 28, wherein the refractive index of said core material decreases in a thickness direction away from said cladding material.

34. The integrated optic chip of claim 28, wherein the trench is formed by etching away a portion of the substrate.

35. The integrated optic chip of claim 28, wherein the core material and the cladding material are coplanar with the substrate upper surface.

36. An optical waveguide, comprising:
   a substrate comprising an upper surface and a trench therein, wherein said trench has a varying profile along at least a part of its length;
   a core material in said trench; and
   a cladding material in said trench between said substrate and said core material,
   wherein said trench tapers from a large widtyh to a small width, and wherein said core material at said small end has a greater index of refraction at said upper surface than said core material at said large end.

37. An optical waveguide, comprising:
   a substrate comprising an upper surface and a trench therein, wherein said trench has a varying profile along at least a part of its length;
   a core material in said trench; and
   a cladding material in said trench between said substrate and said core material,
   wherein said core material and said cladding material fill said trench.

38. An integrated optic chip, comprising:
   a substrate comprising an upper surface;
   a waveguide comprising:
      a trench in said substrate, said trench comprising a varying profile along at least a part of its length;
      a core material in said trench; and
      a cladding material in said trench between said substrate and said core material;
      wherein said core material and said cladding material fill said trench; and integrated optical circuits optically coupled to said waveguide.

* * * * *